Aug. 4, 1931.  C. V. KOONS  1,816,979
SAFETY GUARD FOR CABLE HOOKS AND THE LIKE
Filed Aug. 8, 1930
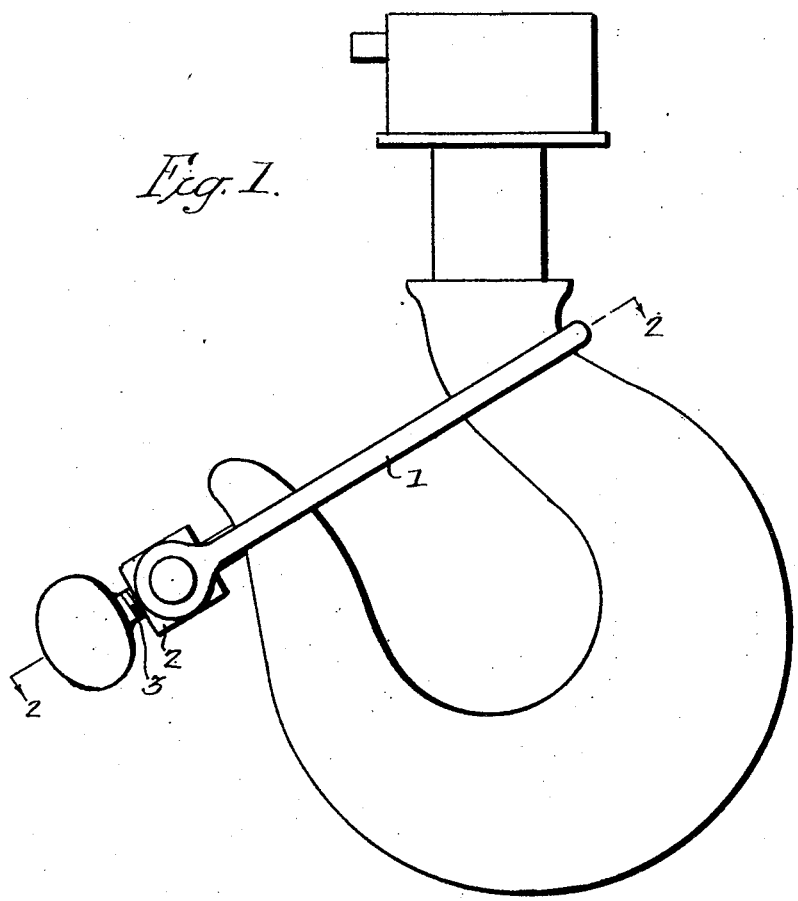
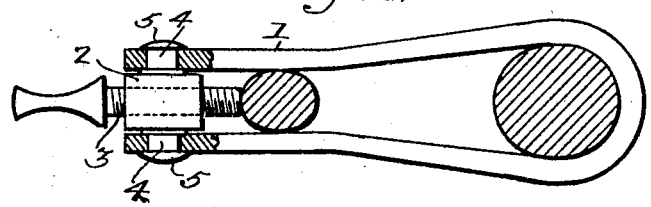
Inventor:
Charles V. Koons.
by his Attorneys
Howson & Howson Patented Aug. 4, 1931

1,816,979

UNITED STATES PATENT OFFICE

CHARLES V. KOONS, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

SAFETY GUARD FOR CABLE HOOKS AND THE LIKE

Application filed August 8, 1930. Serial No. 474,049.

This invention relates to improvements in safety guards for cable hooks and the like.

The principal object of the invention is to provide an improved guard of the stated character which may be readily attached and detached from the hook and which shall comprise retaining means positive in character whereby accidental displacement of the guard is substantially precluded.

Another object of the invention is to provide a guard of the stated character which shall be self-adjustable for hooks of somewhat differing form and dimensions.

In the attached drawings:

Figure 1 is a side elevational view of a hook equipped with a safety guard made in accordance with my invention, and Fig. 2 is a sectional view on the line 2—2, Fig. 1.

With reference to the drawings, a guard made in accordance with my invention and in a preferred form comprises a yoke 1 adapted to embrace the hook as illustrated around the base and nose portions. The yoke is substantially U-shaped in form, and between the terminal ends of the yoke bifurcations is pivotally secured a nut 2 in which is threaded a thumb screw 3. The nut 2 has trunnions 4, 4 projecting from the sides thereof through eyelets formed in the extremities of the yoke arms, and the outer ends of the trunnions, following insertion, are riveted over, as illustrated at 5, to thereby retain the nut in the yoke and to secure the arms of the yoke in fixed relation. The dimensions of the yoke are such that when applied to the hook as illustrated in the drawings, the thumb screw 3 may be turned inwardly into engagement with the outer surface of the outturned nose portion of the hook whereby the yoke is locked in the operative position. The guard may be released by backing off the thumb nut 3 in obvious manner to an extent permitting the yoke to clear the outer end of the hook whereby the yoke may be adjusted to an inoperative position or may be freed entirely from the hook. By reason of the pivotal mounting of the nut 2 within the yoke, it is apparent that the nut is self-adjustable to afford a reaction thrust between the thumb screw and the hook coinciding substantially with the axis of the said screw whereby a highly efficient connection is established between the yoke and the hook precluding accidental displacement and insuring that the guard shall be maintained in the operative position until such time as it may be desirable to remove it.

While I have illustrated a desirably simple embodiment of my invention, it will be apparent that there may be considerable modification in the structural details without departure from the invention.

I claim:

1. A safety guard for hooks comprising a hook-embracing yoke member, a nut pivotally mounted in said yoke, and a thumb screw threaded into said nut and adapted to react with the adjacent embraced portion of the hook to lock the said guard in position, said yoke member being completely detachable from the hook when said screw is released.

2. In a safety guard for hooks, the combination with a yoke adapted to embrace and extend between the base and nose portions of a hook, and a thumb screw threaded into one end of the yoke and adapted to engage an adjacent portion of the latter to thereby secure the yoke in position, said yoke member being completely detachable from the hook when the said screw is released.

3. In a safety guard for hooks, the combination with a yoke adapted to embrace and extend between the base and nose portions of a hook, and threaded means for releasably retaining said yoke in the hook-embracing position.

4. A safety guard for hooks and the like comprising a yoke having a hook-embracing portion and a nut adjustably supported in the opposite end of said yoke, and a screw threaded into said nut and projecting into the space embraced by said yoke.

5. In a safety guard for hooks, a U-shaped metallic yoke member having axially aligned eyelets at the extremities, a nut having trunnions pivotally engaged in said eyelets, and a screw threaded into said nut and projecting into the space embraced by said yoke.

6. In a safety guard for hooks, a U-shaped metallic yoke member having axially aligned eyelets at the extremities, a nut having trunnions pivotally engaged in said eyelets, a screw threaded into said nut and projecting into the space embraced by said yoke, and means for retaining said trunnions in the eyelets.

CHARLES V. KOONS.